United States Patent [19]
Hostettler

[11] 3,882,054

[45] May 6, 1975

[54] METHOD FOR MANUFACTURING FLEXIBLE, VAPOR-PERMEABLE, HYDROLYSIS-STABLE POLYURETHANE ELASTOMERS AND THE PRODUCTS PRODUCED THEREFROM

[75] Inventor: Fritz Hostettler, Freehold, N.J.

[73] Assignee: IPRC Corporation, Farmington, N.J.

[22] Filed: Feb. 6, 1973

[21] Appl. No.: 330,102

[52] U.S. Cl.............. 260/2.5 AY; 260/2.5 AN; 260/2.5 AD; 264/49
[51] Int. Cl............................................ C08g 22/44
[58] Field of Search................. 260/2.5 AY; 264/49

[56] References Cited
UNITED STATES PATENTS

| | | | |
|---|---|---|---|
| 3,523,918 | 8/1970 | Gonzalez | 260/2.5 AZ |
| 3,551,364 | 12/1970 | McGarr | 260/2.5 AY |

FOREIGN PATENTS OR APPLICATIONS

| | | | |
|---|---|---|---|
| 1,099,676 | 1/1968 | United Kingdom | 260/2.5 AY |
| 1,243,504 | 8/1971 | United Kingdom | 260/2.5 AY |

*Primary Examiner*—Donald E. Czaja
*Assistant Examiner*—C. Warren Ivy
*Attorney, Agent, or Firm*—Watson Leavenworth Kelton & Taggart

[57] ABSTRACT

A method is disclosed for manufacturing flexible, vapor-permeable, hydrolysis-stable polyurethane elastomers which comprises:
  a. distributing at least one finely-divided non-hygroscopic pore-forming material substantially uniformly throughout a hydrolysis-stable polyurethane reaction mixture, the pore-forming material being insoluble or only sparingly soluble in the polyurethane reaction mixture and inert with respect thereto;
  b. reacting the polyurethane reaction mixture in a mold to provide a polymerizate of desired form; and
  c. leaching the polymerizate with a substance which dissolves or decomposes the pore-forming material but does not dissolve or significantly affect the polymerizate to provide a flexible, vapor-permeable, hydrolysis-stable polyurethane elastomer.

6 Claims, No Drawings

METHOD FOR MANUFACTURING FLEXIBLE, VAPOR-PERMEABLE, HYDROLYSIS-STABLE POLYURETHANE ELASTOMERS AND THE PRODUCTS PRODUCED THEREFROM

BACKGROUND OF THE INVENTION

1. Field of the Invention

This invention relates to the field of synthetic poromeric materials and more specifically, to flexible, vapor-permeable, hydrolysis-stable polyurethane elastomers which are leather-like in feel and appearance.

2. Description of the Prior Art

Completely synthetic replacements for natural leather which possess the feel, appearance and vapor-permeable characteristics of the latter have been of considerable interest for many years, particularly for use in footwear, apparel and upholstery.

The vapor-permeable properties of a synthetic is the most important factor in its ability to simulate the properties of natural leather. Numerous vapor-permeable synthetics have been developed which also possess good surface appearance and acceptable mechanical and wear properties.

U.S. Pat. No. 2,819,981 discloses a flexible, vapor-permeable, water-resistant vinyl film which is prepared by incorporating into the vinyl mixture a finely-divided non-hygroscopic pore-forming material soluble in a nonsolvent for the polymeric composition.

After fusing, the polymer can then be washed to remove the nonhygroscopic material to provide a water-resistant vapor-permeable vinyl polymer film or coated fabric. In processing such vinyl compounds with the powdered or finely-divided nonhygroscopic pore-forming material on a rubber or plastic calender, the operation is difficult unless more plasticizer is used than is desired to obtain a finished vinyl product with the required hand and slip characteristics after the pore former is washed out.

This disadvantage is somewhat ameliorated by replacing part of the plasticizer with a small amount of softener soluble in a nonsolvent for the polymeric material prior to calendering or casting the vinyl compound. Even so, relatively large amounts of plasticizer must be incorporated into the vinyl compounds to maintain their flexibility.

To avoid the problem associated with the vinyl-based porometric materials, other elastomeric compositions which do not necessarily require the use of plasticizers can be employed.

A vapor-permeable polyurethane elastomer has been prepared by dissolving a polyurethane in dimethylformamide, casting the solution to form a film, exposing the film to air for a short period, immersing the film in water to coagulate the polyurethane and finally, drying the film.

In a variation of this process, the solution of polyurethane in dimethylformamide is poured onto a nonwoven mat of polyester and thereafter treated in the above-described manner. Known and conventional finishing techniques can be employed to impart various surface effects to the porometric materials, as for example, the look and feel of natural suede leather.

It will be noted that the urethane elastomers are prepared in multi-step operations. Each of the operations must be carefully controlled in order to provide the desired result.

Accordingly, there exists a need for a method for manufacturing flexible, vapor-permeable, hydrolysis-stable polyurethane elastomers which is simpler both in view of the number of steps required and the exactness with which each operation is carried out.

There also exists a need for a flexible, vapor-permeable hydrolysis-stable polyurethane elastomer which does not require the use of plasticizer nor the inclusion of any other reinforcing material in order to provide acceptable mechanical and wear characteristics.

SUMMARY OF THE INVENTION

It has been discovered that flexible, vapor-permeable, hydrolysis-stable polyurethane elastomers can be conveniently manufactured by the method which comprises:

a. distributing at least one finely-divided non-hygroscopic pore-forming material substantially uniformly throughout a hydrolysis-stable polyurethane reaction mixture;

b. reacting the polyurethane reaction mixture in a mold to provide a polymerizate of desired form; and c. leaching the polymerizate with a substance which dissolves or decomposes the pore-forming material but does not dissolve or significantly effect the polymerizate to provide a flexible, vapor-permeable, hydrolysis-stable polyurethane elastomer.

The method of this invention does not require the use of plasticizers and is considerably simplified over the known and conventional methods for making poromeric polyurethanes. The elastomers which result from the method of this invention, in addition to possessing good flexibility without the need for plasticizer and excellent vapor-permeable properties demonstrate acceptable mechanical and wear characteristics without resorting to other reinforcing means.

DESCRIPTION OF THE PREFERRED EMBODIMENTS

The pore-forming material of this invention must be substantially nonhygroscopic and insoluble or only sparingly soluble in the polyurethane reaction mixture and any other compounding ingredients but must be soluble or decomposable in a substance which is a nonsolvent for the polymerizate or otherwise does not significantly affect the polymerizate. Moreover, the pore-forming material must not melt, decompose or react with the polyurethane reaction mixture under the prevailing conditions of the polymerization reaction.

Examples of useful pore-formers which can be leached with water include the alkaline and ammonium halide salts such as ammonium chloride, sodium chloride, potassium chloride, sodium bromide, potassium bromide and the like and mixtures thereof which are readily soluble in water which is essentially a non-solvent for the hydrolysis-stable polyurethane elastomers. Other materials possessing the aforementioned properties can also be used in carrying out the method of this invention.

It is advantageous to add the pore-forming material prior to the introduction of the polyurethane reaction mixture into the mixer. This will insure substantially uniform distribution of the pore-forming material throughout the reaction mixture just prior to the injection of the latter into the mold.

The pore-forming material is in a finely-divided condition to provide after removal from the polymerizate very small pores or a microporous structure in which substantially all of the pores are interconnecting. The size and quantity of the pore-forming particles to be added to a particular urethane reaction mixture can be readily determined by one skilled in the art employing known techniques. Generally, the pores which result after removal of the material should be just barely visible to the naked eye when looking at the cut edge of the film. The amount of pore-forming material can vary from about 50 to 300 percent by weight based on the weight of the polyurethane reaction mixture.

Any polyurethane reaction mixtures which provide flexible, hydrolysis-stable polymerizates can be employed in the method of this invention. Especially advantageous, however, are the flexible polyurethanes which possess the ability to be flame laminated, to withstand dry-cleaning solvents and which demonstrate excellent hydrolysis-stability over a wide temperature range prepared by reacting:

i. liquid polyesters containing from 10 to about 72 per cent by weight of the epsilon-oxycaproyl unit

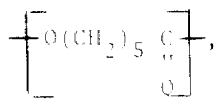

from 90 to about 28 per cent by weight of a polymer segment comprising a dicarboxylic acid or corresponding anhydride, an alkylene glycol and an effective amount of a polyol branching agent, the liquid polyesters having a hydroxyl equivalent range of from about 800 to 1400;

ii. an organic polyisocyanate; and iii. a catalyst (optional)

In the manufacture of the polyester intermediates, a mixture consisting of from 10 percent by weight to about 72 percent by weight of epsilon-caprolactone, a dicarboxylic acid, advantageously adipic acid, a glycol, advantageously diethylene glycol and a small portion of a triol or tetrol, advantageously trimethylolpropane, are reacted at a temperature from about 100°C to as high as 300°C, advantageously from 100° to about 250°C, if desired in the presence of a catalyst, to form a substantially hydroxyl-terminated polyester having a hydroxyl equivalent weight of from about 800 to 1400. The epsilon-caprolactone may be replaced with about 12 to 80 percent by weight of a mixture of 6-hydroxycaproic acid and its lower oligomers.

The hydrolytic stability of the polyurethane foams can be even further improved by the addition of small quantities on monomeric or polymeric carbodiimides to the foaming mixture.

It is also within the scope of this invention to perform the polycondensation reaction in the absence of a catalyst, which is at times desirable since it is known that metallic residues in the polyesters have a significant effect upon the catalysis of the subsequent reactions of the polyesters with the polyisocyanates to produce the polyurethane foams.

The polyesterification reaction is conveniently carried out at a temperature range of from about 100°C to about 300°C, advantageously from 100°C to about 250°C, for periods sufficient to lower the carboxyl value to 5 or less, advantageously to 2 or less. By-product water of condensation can be removed by distillation under normal pressure, or under reduced pressure or by means of azeotropic distillation with solvents such as benzene, toluene, ethylbenzene, xylene and so forth.

The organic polyisocyanates which can advantageously be used herein include 2,4- and 2,6-toluene diisocyanates or mixtures thereof, diphenylmethane diisocyanates and polymeric isocyanates of condensation products of formaldehyde and aniline or o-toluidine. Mixtures of diphenylmethane diisocyanates in admixture with their carbodiimides can also be advantageously employed.

If it is desired to employ a catalyst, any of the known and conventional catalysts for the polyurethane reaction can be utilized, e.g., tertiary amines, organometallics or combinations thereof in quantities as low as 5 parts per million.

Examples of tertiary amines which can advantageously be employed herein include N-methyl and N-ethylmorpholine, N-cocomorpholine and dimethylbenzylamine.

Examples of organometallics which can be employed include such tin compounds as stannous octoate, stannous oleate, dibutyltin-di-2-ethylhexoate and dibutyltin dilaurate.

In addition to the polyurethane reaction mixture, supra, it is also advantageous to employ one of the so-called "integral skin" polyurethane foam formulations in carrying out the method of this invention. Foams prepared with the latter type reaction mixtures possess a dense skin surface but a foamed interior and are especially attractive for use in upholstery, artificial leathers, and so forth. However, the skin is relatively vapor-impermeable but by application of the method of this invention, can be made to possess a microporous surface.

An integral skin polyurethane foam reaction mixture which can advantageously be used in the method herein comprises:

i. at least one ethylene oxide capped alkylene oxide-polyol adduct which possesses 2 to 6 hydroxyl groups, the hydroxyl groups being predominantly primary hydroxyl groups, and the polyol having a molecular weight of at least 250 and representing from about 45 to 70 weight percent of the total weight of the formulation;

ii. at least one compound having a different rate of reactivity than the aforesaid polyol adduct and being characterized by at least two polyfunctional active hydrogen groups and selected from the group consisting of primary hydroxyl, mixed primary or secondary hydroxyl and primary amine, secondary amine and mixed primary and secondary amine groups, the polyfunctional compound having a molecular weight below 500 and representing from about 5 to 15 weight percent of the total weight of the formulation;

iii. an organic polyisocyanate;

iv. a catalyst (optional); and v. a blowing agent.

The above formulation is based on the observation that isocyanates in general will react faster with low molecular weight compounds containing substantially primary hydroxyl groups, relatively fast with the primary hydroxyl-containing polyether polyols and quite slowly in relation to the above reactants with polyether polyols containing essentially all secondary hydroxyl groups. Thus it has been found that where the foam formulation contains two hydroxyl-containing compounds of different rates of reactivity, most of the hydroxyl groups of the higher order of reactivity will selectively react with the isocyanate groups first and will thereby produce an integral skin on the polyurethane foam.

Advantageously, the polyoxyalkylene polyols capped with ethylene oxide can be used. These polyols possess a predominant portion of their hydroxyl end-groups in the form of primary hydroxyl end-groups.

The low molecular weight starters for these polyols are well known in the art and include such diols as ethylene glycol, diethylene glycol, triethylene glycol, 2,3-butanediol, 2,4-pentanediol, 1,2-pentanediol,1,2-propanediol, dipropylene glycol, tripropylene glycol, tetramethylene glycol, 1,3-butanediol, 1,5-hexanediol, and so forth.

Examples of polyfunctional active hydrogen compounds which are useful herein include the aliphatic diols such as ethylene glycol, 1,3-propanediol, 1,4-butanediol, 1,5-pentanediol, 1,6-hexanediol, alkylene glycols such as diethylene glycol, triethylene glycol, the reaction products of ε-caprolactone with alkylene glycols, hydroxyl polyesters, primary diamines and secondary diamines.

The same polyisocyanates and catalysts, supra, can be employed with these integral skin formulations.

The polyurethane reaction mixtures of this invention can be polymerized according to the prepolymer or "one-shot" method and can be cast in open molds or injection-molded according to well known methods. In commercial injection-molding operations, a predetermined quantity of each ingredient is pumped to a mixing head where the reactants are properly blended and the reaction mixture is then injected into the mold where polymerization subsequently takes place. The individual ingredients can be metered singly if desired or certain ingredients, for example the water, catalysts and surfactants, may be premixed before being metered to the mixing head. The initial temperature of the foam ingredients is normally about room temperature, but departures both above and below room temperature are permissible.

The foaming reaction is exothermic and during the foam operation, temperatures in excess of 150°C are often encountered. The cure of the foam is conducted at room temperature up to about 170°C. Cure time will depend on many factors, such as the amount and type of catalyst, the isocyanate index number, cure temperature and the like.

The following example is illustrative of the method of the invention as well as the products produced thereby.

EXAMPLE 100 gm of prepolymer (Adiprene 167, Dupont's polyalkylene ether glycol/diisocyanate reaction product having approximately a 6.3 percent NCO value) was placed in a 500 ml. flask followed by the addition of 153 gm of microsized salt and 22 gm. of ε-caprolactone. The flask was heated to 100°C and molten Moca (Dupont's 4,4'-methylenebis (2-chloroaniline)) was then added. The reaction mixture was stirred for 4 minutes and placed in a mold which was pressed at 100°C under 35,000 psi.

The polymerizate was removed from the mold and leached with water having a temperature of 60°C. The resulting microporous elastomer was flexible, possessed good tensile strength and had the appearance and feel of natural leather.

I claim:

1. A method for manufacturing flexible, vapor-permeable, hydrolysis-stable polyurethane elastomers which comprises:

a. distributing at least one finely-divided non-hygroscopic solid pore-forming material substantially uniformly throughout a hydrolysis-stable polyurethane forming reaction mixture, the pore-forming material being insoluble or only sparingly soluble in the polyurethane forming reaction mixture and inert with respect thereto and the polyurethane forming reaction mixture providing a polymerizate which is substantially free from solvent therefor;

b. reacting the polyurethane forming reaction mixture in a mold to provide a polymerizate of desired form, the polymerizate being unassociated with any substrate or support therefor when removed from the mold; and c. leaching the polymerizate with a substance which dissolves or decomposes the pore-forming material but does not dissolve or significantly affect the polymerizate to provide a flexible, vapor-permeable, hydrolysis-stable polyurethane elastomer.

2. The method of claim 1 wherein the pore-forming material is an alkaline or ammonium halide salt.

3. The method of claim 2 wherein the salt is an ammonium chloride, sodium chloride, potassium chloride, sodium bromide or potassium bromide salt.

4. The method of claim 3 wherein the pore-forming material is present at about 50 to 300 percent by weight based on the weight of the polyurethane forming reaction mixture.

5. The method of claim 4 wherein the substance employed for leaching the pore-forming material is water.

6. The flexible, vapor-permeable, hydrolysis-stable polyurethane elastomers prepared by the method of claim 1.

* * * * *